United States Patent [19]
Hardway, Jr.

[11] 3,774,237
[45] Nov. 20, 1973

[54] DIFFERENTIAL METHODS AND APPARATUS FOR MEASURING DIELECTRIC CONSTANT TO DETERMINE A CONDITION OF A MATERIAL

[75] Inventor: Edward V. Hardway, Jr., Houston, Tex.

[73] Assignee: Spearhead, Inc., Houston, Tex.

[22] Filed: Oct. 8, 1971

[21] Appl. No.: 187,793

[52] U.S. Cl. .............................. 324/61 R, 73/304 C
[51] Int. Cl. .............................................. G01r 27/26
[58] Field of Search........................ 324/61 R, 61 P; 73/304 C

[56] References Cited
UNITED STATES PATENTS

| | | | |
|---|---|---|---|
| 2,800,628 | 7/1957 | Stinson et al. | 324/61 R |
| 3,290,588 | 12/1966 | Norwich | 324/61 R |
| 3,493,855 | 2/1970 | Norwich | 324/61 R |
| 3,209,247 | 9/1965 | Mead et al. | 324/61 R |
| 3,256,482 | 6/1966 | Rosso | 324/61 R |
| 3,066,529 | 12/1962 | Warren | 324/61 R X |
| 2,802,173 | 8/1957 | Nisle | 324/61 R X |
| 2,908,166 | 10/1959 | Johnson | 324/61 R X |
| 3,079,797 | 3/1963 | Hermanson | 324/61 R X |
| 3,394,307 | 7/1968 | Nilsson | 324/61 P |
| 3,452,275 | 6/1969 | Haines et al. | 324/61 R X |

Primary Examiner—Stanley T. Krawczewicz
Attorney—W. F. Hyer et al.

[57] ABSTRACT

Method and apparatus responsive to conditions such as the moisture content or ingredients ratio of a material are disclosed in which the dielectric constant of a standard sample of such material of a reference moisture content or ingredients ratio is compared in a three-terminal differential capacitive device including two three-terminal capacitor probes with the dielectric constant of a test sample of such material of unknown moisture content or ingredients ratio. The comparison provides an electrical output signal proportional to the differences in moisture content or ingredients ratio of the test sample and the standard sample. For example, the differential capacitive device may be mounted in a differential capacitive cell which includes a standard sample cavity in which the standard sample is placed around the electrodes or conductive elements of one three-terminal capacitive probe and a test cavity in which the test sample is placed around the electrodes or conductive elements of a second three-terminal capacitive probe. Each probe of the differential capacitive device includes a conductive driven element, a conductive receptor element connected to an amplifier and maintained at virtual ground, and suitable shielding connected to a ground terminal. The test cavity is maintained at the same temperature as the standard sample cavity and the feed through capacity of each probe is a function of the dielectric constant of the material between their electrodes.

28 Claims, 15 Drawing Figures

Fig_1

Fig_2

Fig_3

Fig_11A

Fig_11B

Fig_10

Fig_12

Fig_13

Fig_14

DIFFERENTIAL METHODS AND APPARATUS FOR MEASURING DIELECTRIC CONSTANT TO DETERMINE A CONDITION OF A MATERIAL

This invention relates to the determination of a condition such as moisture content or ingredients ratio of a material and, in one of its aspects, to methods and apparatus responsive to the dielectric constant of the material to provide such determination. Another aspect of this invention relates to three-terminal differential capacitive devices which are particularly adapted to permit the comparison in the laboratory, or on-stream in an industrial flow process, of moisture content or ingredients ratio of a standard sample of material of known or desired moisture content or ingredients ratio and a test sample of such material of unknown moisture content or ingredients ratio. The comparison provides an electrical output signal responsive to the difference in moisture content or ingredients ratio of the samples and this signal can be measured or utilized to control a desired function. Examples of such materials are cereal and food grains, crude oil, and pipeline petroleum products or by-products.

In the prior art, determination of moisture in materials has been made by utilizing a variety of techniques. One of the most accurate, but very time consuming methods with solid materials, is to weigh the sample, dry it in an oven, and then weigh it again. Also, microwave apparatus utilizing rotational relaxation of water molecules has been used onstream in process plants, but the equipment is very costly. Less expensive and far more commonly used moisture testers in use have relied on the measurement of electrical conductivity, dissipation factor, or dielectric constant to determine water content. All of these methods require uniform packing of the material sample for accurate results.

The relative merits of measuring dielectric constant vs. measuring conductivity or dissipation factor has generally been a matter of controversy among skilled persons in the moisture testing art. The method and apparatus for doing either is complicated by these factors:

1. Conductivity and dielectric constant of solid materials both change with temperature and in a nonlinear fashion. The relationship is different for each different material or mixture.
2. Neither the dielectric constant nor conductivity vary linearly with moisture content as varying percentages of the water molecules present are linked or bonded to other molecules.

Since conductivity is influenced by the presence of small amounts of impurities, the determination of dielectric constant has generally been preferred in many applications as a method of determining moisture content or the ratio of two ingredients of different dielectric constant. Although the measurement of dielectric constant is complicated by temperature and linearity problems, it has a particular advantage in moisture measurement in that the dielectric constant of water is 80 as compared to about 3-4 for many grains and other solid materials of interest. In practice, however, the measurement of dielectric constant is also complicated by the presence of conductivity that is the result of slow ion migration and cannot be completely cancelled by the use of a phase detector.

In order to provide good accuracy in the prior art, dielectric constant measurements have generally been made in a cell with the sample being tested maintained by a heater and thermostat at a predetermined temperature. Also, in moisture testers for a variety of grains, a special, separate plug-in electrical network has generally been used for each type of grain to be tested to set the sensitivity of the apparatus and provide a linear output signal to an indicator or printer. As is readily apparent, while these prior techniques compensate for the temperature and linearity problems stated, they further complicate the equipment used for the measurements being made and add to their cost. Also, the need for such compensating techniques makes it difficult to provide a suitable device for measuring moisture content or ingredients ratio which may be readily adapted for use in measuring the moisture content or ingredients ratio of a large number of different materials under varying conditions with a direct read-out.

It is thus an object of this invention to provide a method and apparatus which utilizes the determination of dielectric constant to indicate a material condition, such as moisture content or ingredients ratio, but in which the above-noted effects of temperature, conductivity, and nonlinearity are effectively eliminated without the use of relatively costly and complex equipment.

Another object of this invention is to provide novel three-terminal differential capacitive devices for providing the desired dielectric constant determination.

Another object of this invention is to provide such a differential capacitive device mounted in a differential cell which permits quantitative indications of the difference in moisture content of ingredients ratio of a standard sample of a material of known or reference moisture content or ingredients ratio from and a test sample of such material of unknown moisture content or ingredients ratio.

Another object of this invention is to provide such a differential cell which provides for the generation of a warning or control signal when the moisture content or ingredients ratio of the test sample differs from that of the standard sample by a predetermined amount.

Another object of this invention is to provide such a method and apparatus which may be readily adapted for onstream monitoring or control of an industrial flow process.

In product pipelines, containing crude oil, kerosene, gasoline, etc., it may be necessary to determine the water or other ingredients content, or the time of arrival of an interface between different products in the pipeline with as little disruption in the flow process as possible. As far as is known to this applicant, there is presently no satisfactory way of accomplishing this, and another object of this invention is to provide a differntial capacitive device which is readily adapted to provide such determination.

Also, in the prior art apparatus and methods which utilize the measurement of dielectric constant for moisture content or ingredients ratio determination, a serious problem has been that the accuracy of the apparatus used has been adversely affected by the length of the connecting cables used, which must either be short or of an exact length. As a result, the distance between various components of the apparatus has to be restricted or elaborate electronic compensating techniques utilized. It is thus another object of this invention to provide three-terminal differential capacitive devices which, in all various applications previously mentioned, permit the use of relatively long connecting cables of varying lengths without appreciable effect in the accuracy of the dielectric constant measurements made.

These and other objects of this invention which will become apparent upon consideration of the description herein and appended claims and drawings are accomplished, according to this invention by providing a three-terminal differential capacitive device which in one embodiment may be mounted in a differential cell which includes a standard sample cavity into which a standard sample of the material being measured of known moisture content or ingredients ratio is placed, and a test sample cavity into which a test sample of such material of unknown moisture content or ingredients ratio is placed. The differential capacitive device includes two three-terminal capacitor probes each mounted in one of said standard sample or test sample cavities, and each including a conductive driven element and a receptor element which is clamped at virtual ground by a high gain amplifier having a feedback loop. The standard and test samples are placed in proximity to (such as about and between) the elements of the three-terminal probe in their respective cavity and the feed through capacity of each probe is a function of the dielectric constant of the material in proximity to its elements. The standard sample cavity and test samples cavities of the differential cell are preferably in close proximity to each other to establish a temperature equilibrium between them. The feed through capacity of each of the three-terminal probes are compared so that small errors in resolution are effectively cancelled and the output circuit preferably includes a synchronous demodulator which cancels the effect of any conductance between the capacitive elements, so that an electrical output signal is provided which is proportional only to the differences, if any, of the dielectric constant of the test sample and the standard sample. Effects of stray and cable capacity are minimized by this arrangement and relatively long cables can be used to connect the differential cell to the input and output electronics.

In another embodiment of this invention, the differential cell includes only one cavity and the differential capacitive device a dual three-terminal capacitor probe including two conductive driven elements and a common receptor element between the two driven elements. The common receptor element is connected to the input of an integrating amplifier having a feedback loop and is clamped at virtual ground. The standard sample is placed between one of the driven elements and the receptor element, and the test sample between the other driven element and the receptor element, and an electrical output signal proportional to the differences in dielectric constant of the standard and test samples is provided. Again, a temperature equilibrium between the test and standard samples is established and the effects of nonlinearities and conductivity effectively canceled. In either of the described embodiments, the electrical output signal may be scaled to provide a direct measurement of the moisture content or ingredients ratio of the test sample, or used to provide a warning or control signal when the moisture content or ingredients ratio of the test sample goes above or below a predetermined amount. The differential cells may be readily used in the laboratory, may be used for random sampling of materials in a process, or in on-stream, continuous or periodic monitoring apparatus.

Where the arrival of an interface of a number of different liquids flowing in a pipeline is being monitored, the three-terminal differential capacitive device of this invention may include a number of standard sample three-terminal probes containing samples of the different products to be encountered, and alternatively switched in a differential capacitive circuit with a three-terminal probe in the pipeline until a balanced output is obtained. In this instance, it also may be desirable to use a separate temperature controller responsive to the temperature in the pipeline to establish temperature equilibrium between the test and standard samples without the need of also placing the standard sample probes in or close to the pipeline. If it is only necessary to determine the time of arrival of a liquid flow interface, then the differential capacitor may include two three-terminal capacitor probes which can be inserted in the pipeline at spaced intervals so that they provide a balanced output prior to arrival of the interface, and have an unbalanced output when the interface arrives.

In the drawings, where like reference numerals are used throughout to represent like parts, and where the preferred embodiments of this invention are illustrated.

Figure 1:
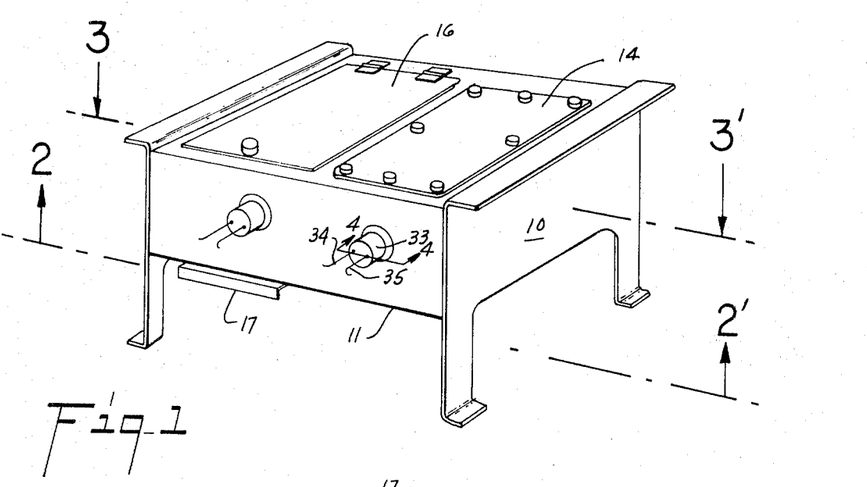
FIG. 1 is an isometric view of one preferred embodiment of a differential cell including a test sample cavity and a standard sample cavity and in which a three-terminal differential capacitive device of this invention is mounted.
Figure 2:
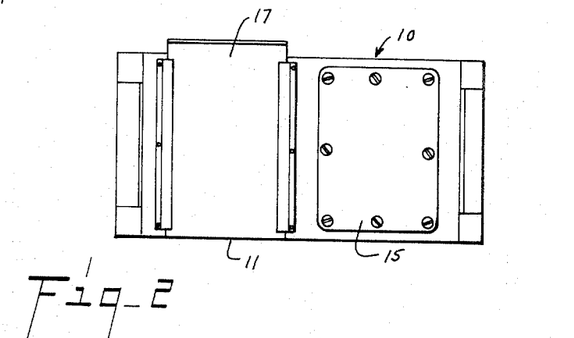
FIG. 2 is a bottom view of the differential cell of FIG. 1.
Figure 3:
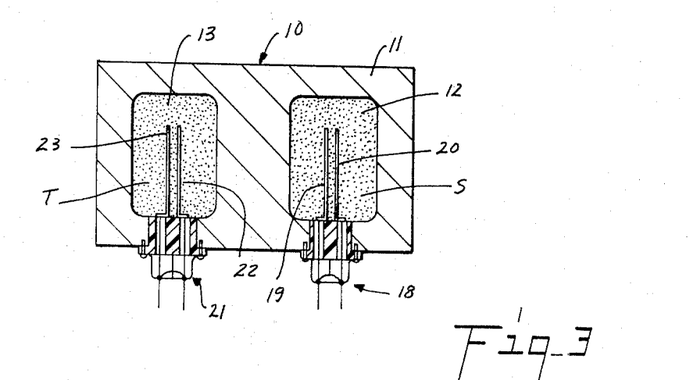
FIG. 3 is a cross section of the cell of FIG. 1, taken at 2-2' in FIG. 1, showing the two interval cavities and the three-terminal capacity probes mounted therein to provide a differential capacitive device.

Referring to the drawings, in FIGS. 1, 2 and 3, a differential cell 10 is illustrated as including a housing 11 and two internal cavities 12 and 13. Cavity 12, on the right-hand side in FIGS. 1, 2 and 3, is a standard sample cavity into which a measured standard sample of the material being tested can be placed. Cavity 12 is sealed at the top and bottom by plates 14 and 15 respectively which are sealed and gasketed to prevent loss or gain of moisture in the standard sample. The left-hand side cavity 13 is a test cavity into which a measured test sample of the material being measured can be placed. Cavity 13 is closed at the top by a lid 16 which can be raised to permit the test sample to be placed in cavity 13, and a bottom sliding tray 17 which can be slid open to permit the test sample to be dumped out. If the dielectric constant of a liquid is being measured, a valve may be provided for dumping the liquid test sample. Housing 11 is preferably made of cast metal of high thermal conductivity to provide a temperature equilibrium in cavities 12 and 13 and the standard and test samples. It is also preferred that cavities 12 and 13 be of the same size and geometry, and the test and standard samples be the same weight and packed uniformly, although, as later explained, known differences in these factors can be compensated for in the input and output electronics used with differential cell 10.

Figure 4:
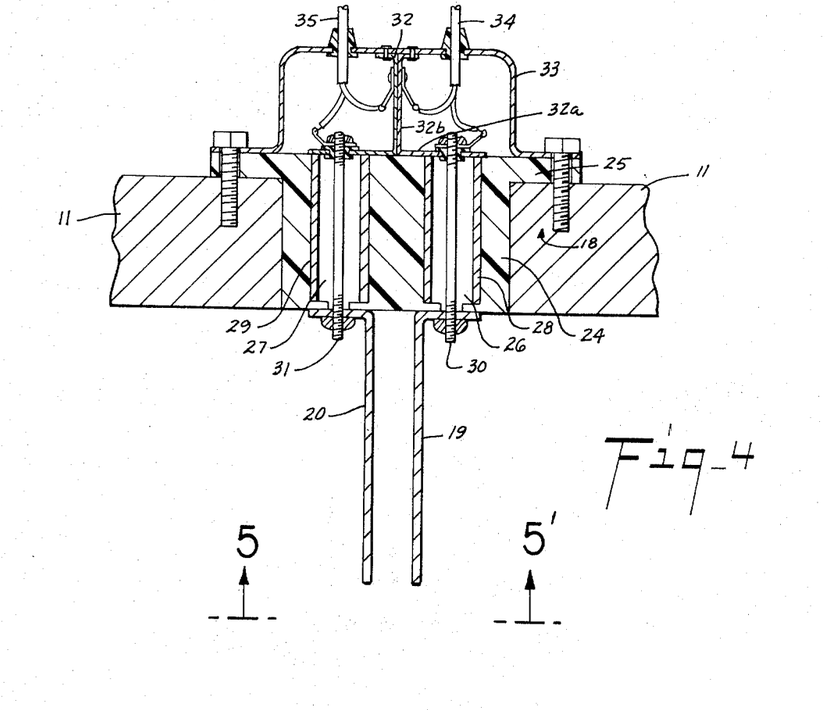
FIG. 4 is a cross-sectional view of one of the three-terminal capacity probes taken at 4-4' in FIG. 1.
Figure 5:
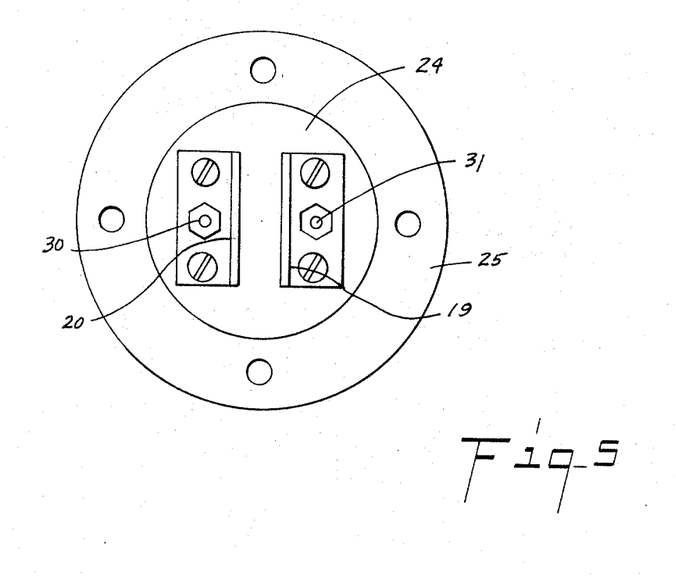
FIG. 5 is an end view of one of the three-terminal capacity probes.

A three-terminal differential capacitive device is mounted in cell 10 and includes two three-terminal probes 18 and 21. Three-terminal capacity probe 18 including a conductive driven element 19 and conductive receptor element 20 is mounted in housing 11 and extends into cavity 12. Probe 21 including a conductive driven element 23 and a conductive receptor element 22 is mounted in housing 11 and extends into cavity 13. Each of probes 18 and 21 are mounted in their respective cavities so that a standard sample S may be placed about and between elements 19 and 20 and a test sample T placed about and between elements 22 and 23. The details of probe 18, which is identical to probe 21, are shown in FIGS. 4 and 5, however, it should be understood that the size and geometry of the elements 19, 20, 22 and 23 of probes 18 and 21 may differ from each other in a known manner and these differences compensated for by the input and output electronics connected to probes 18 and 21. Also, the arrangement of driven and receptor elements can be reversed from that described.

Referring to FIGS. 4 and 5, probe 18 includes a cylindrical hub 24 made of electrically nonconductive material and including a circular outer flange 25. Hub 24 includes two spaced-apart openings 26 and 27 passing through it and into which cylindrical metal shielding sleeves 28 and 29 are respectively inserted. Driven element 19 is connected to a threaded rod 30 passing through sleeve 28 and receptor element 20 is connected to a threaded rod 31 passing through sleeve 29. A shield partition 32 is mounted on the outside of hub 24 and includes a bottom plate 32a electrically contacting sleeves 28 and 29, and extending between and slightly beyond the outer walls of sleeves 28 and 29, and an upward extending shield member 32b having a laterally extending upper flange portion. Rods 30 and 31 extend through plate 32a and are insulated thereby grommets and secured by nuts. A shielding shroud 33 is mounted about the outer surface of hub 24 and is secured to partition 32 and to housing 11. Suitable connecting posts are provided on rods 30 and 31 and on partition 32 for electrical connection to coaxial cables. The inner conductor of a coaxial cable 34 is connected to a connecting post connected to inner rod 30 and the inner conductor of a coaxial cable 35 is connected to connecting post connected to rod 31, and the shield conductors of these cables, which are connected to circuit ground, are connected to a connecting post connected to partition 32 which grounds partition 32, shroud 33, housing 11 and sleeves 28 and 29. Thus, in three-terminal capacitor probe 18, drive element 19 provides one terminal which is a high signal level terminal and is adapted to be connected by cable 34 to a source of input electrical signals. Receptor element 20 provides another terminal which is a low signal level terminal and is adapted to be connected by cable 35 to electronic output circuits to provide an electrical output signal proportional to the feed through capacity of the probe, and the third terminal is a ground terminal and is adapted to be connected by the shields on cables 34 and 35 to circuit ground of the input and output electronics. Thus, with the arrangement described, almost all of the feed through capacity of the probe is between elements 19 and 20 and the capacitance between each capacitive element and ground has no significant effect. However, it is very important that the elements 19 and 20 be completely shielded from each other by grounded shields and that housing 11 be grounded.

Suitable openings are provided in the side wall of housing 11 to permit the insertion and mounting of probes 18 and 21. Probe 21 also includes a coaxial cable adapted to connect its driven element 23, or high signal level terminal, to a source of input electrical signals, its receptor element 22, or low signal level terminal, to the output electronics, and its ground terminal to input and output electronics circuit ground. However, when the cell 10 is in use, driven element 23 is driven by input electrical signals of substantially the same amplitude as the signals that drive element 19 of probe 18, but of opposite phase to provide a balanced or differential output so that if receptor elements 20 and 22 are connected together to the input of the output electronics, then when the dielectric constant between the respective probes 18 and 21 is equal (or only air is present) zero signal output is provided.

Figure 6:
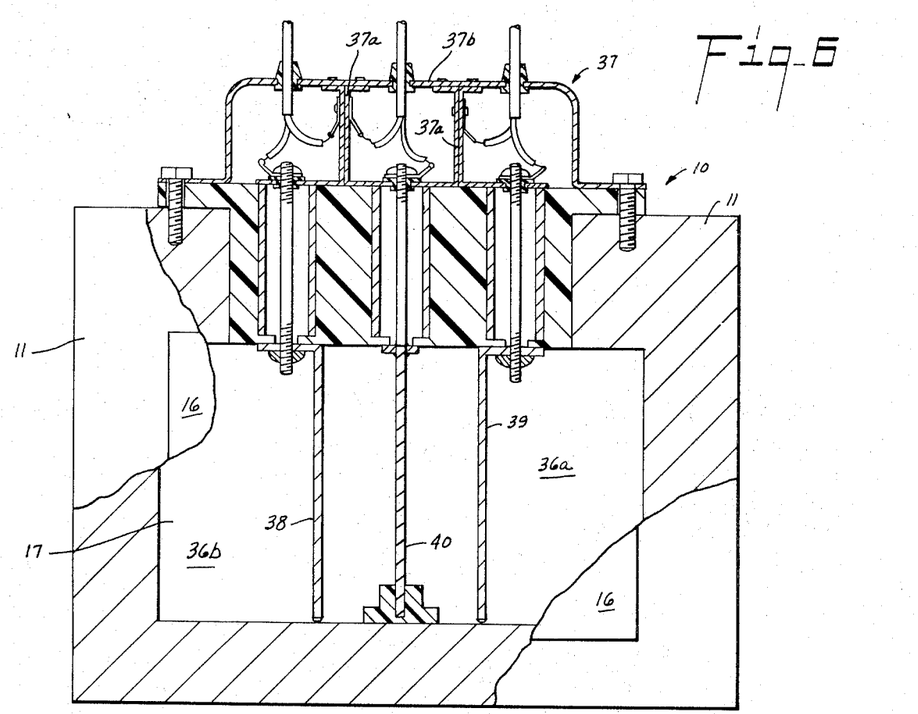
FIG. 6 is a partial cut away view of another embodiment of a differential cell in which the three-terminal differential capacitive device of this invention is a dual three-terminal capacitive probe with a common receptor element.

Referring to FIG. 6, another form of differential cell 10 is disclosed in which housing 11 includes only one cavity divided into two sealed apart sections 36a and 36b into which a dual three-terminal capacitor probe 37 is inserted to provide a differential capacitive device. Housing 11 may be constructed similar to that shown in FIGS. 1 and 2 but with a single lid 16 and bottom tray 17 sealing and enclosing the single cavity. Probe 37 is similar to probe 18 previously described except that three capacitive elements are provided spaced apart from each other and shielded from each other. In probe 37, one of the elements, for example, the left-hand element 38, is a conductive driven element which is adapted to be connected to a source of input electrical signals of a substantially constant amplitude and the right-hand element 39 is a second conductive driven element adapted to be connected to a source of electrical input signals of the same amplitude but of opposite phase. Disposed between elements 38 and 39 is a conductive receptor element 40 which totally isolates the two sections 36a and 36b, one of which contains test material and the other a reference material. Element 40 forms a common receptor element between elements 38 and 39 and is adapted to be connected to an output circuit. Probe 37 includes a grounded sleeve about each of the rods connecting the respective elements to their connecting post, a grounded partition 37a separating each of the connecting posts of the different elements and grounded shroud 37b. Thus, in this embodiment, terminals 38 and 40 form one three-terminal capacitor and terminals 39 and 40 form the other with the terminal connected to element 40 being a common receptor element and the third terminal being ground.

Figure 7:
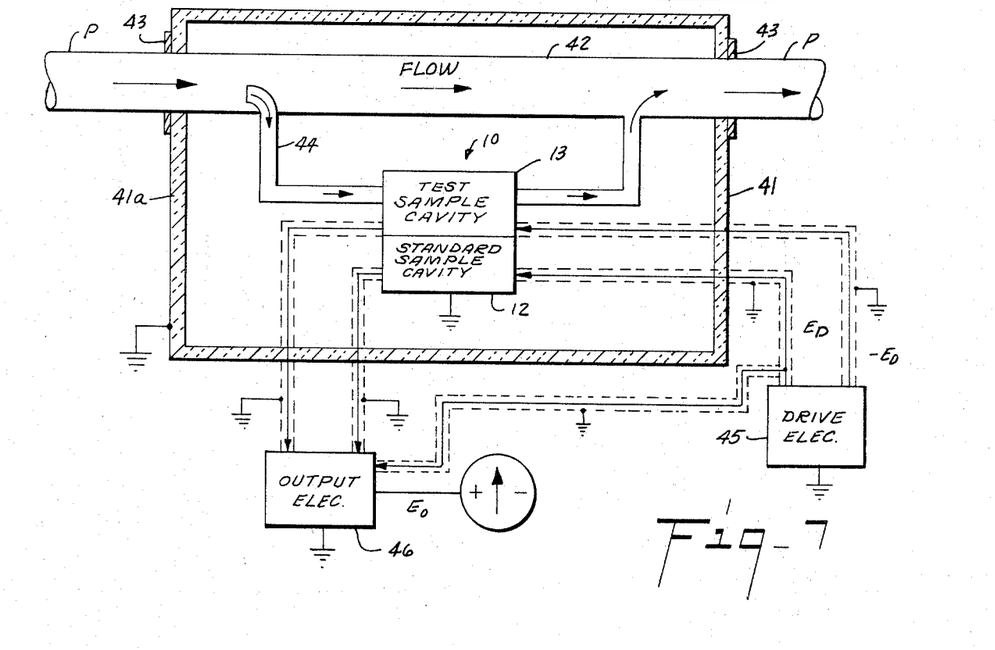
FIG. 7 is a diagramatic representation of an apparatus utilizing a differential cell including the three-terminal differential capacitive device of this invention to monitor the moisture content or ingredients ratio of a material in a flow process.

Referring to FIG. 7, a schematic representation is provided of differential cell 10 including standard sample cavity 12 and a test sample cavity 13 being used to monitor a condition of a material in a pipeline P, for example, the moisture content of crude oil. In this illustration, cell 10 is mounted in an enclosure 41 which is preferably thermally insulated by insulating material 41a and includes an internal pipe conduit 42 adapted to be connected in series with pipeline P such as by threaded couplings 43. A by-pass conduit 44 extends from conduit 42 into test cavity 13 and from test cavity 13 back into conduit 42 and the pipeline. In this manner, a continuous stream of material to be tested is taken off the process line and conventional inlet and outlet valves (not shown) can be provided in test cavity 13 to insure that the test sample is of uniform quantity equal to the quantity of the material in cavity 13, and is uniformly packed. Suitable drive electronics 45 providing opposite phase input signals $E_D$ and $-E_D$ and output electronics 46 providing an electrical output signal $E_o$ proportional to the differences in dielectric constant of the standard and test samples, are connected to cell 10 by shielded cables and may be located away from enclosure 41. The input and output circuits are described in more detail with references to FIGS. 8 and 9. Since cavities 12 and 13 are close together and close to pipeline P, and enclosure 41 is insulated, temperature equilibrium between the compared samples can be maintained. For solids, such as rice or grains, a screw conveyer would be used to move the test material through the cell.

Figures 8, 9:
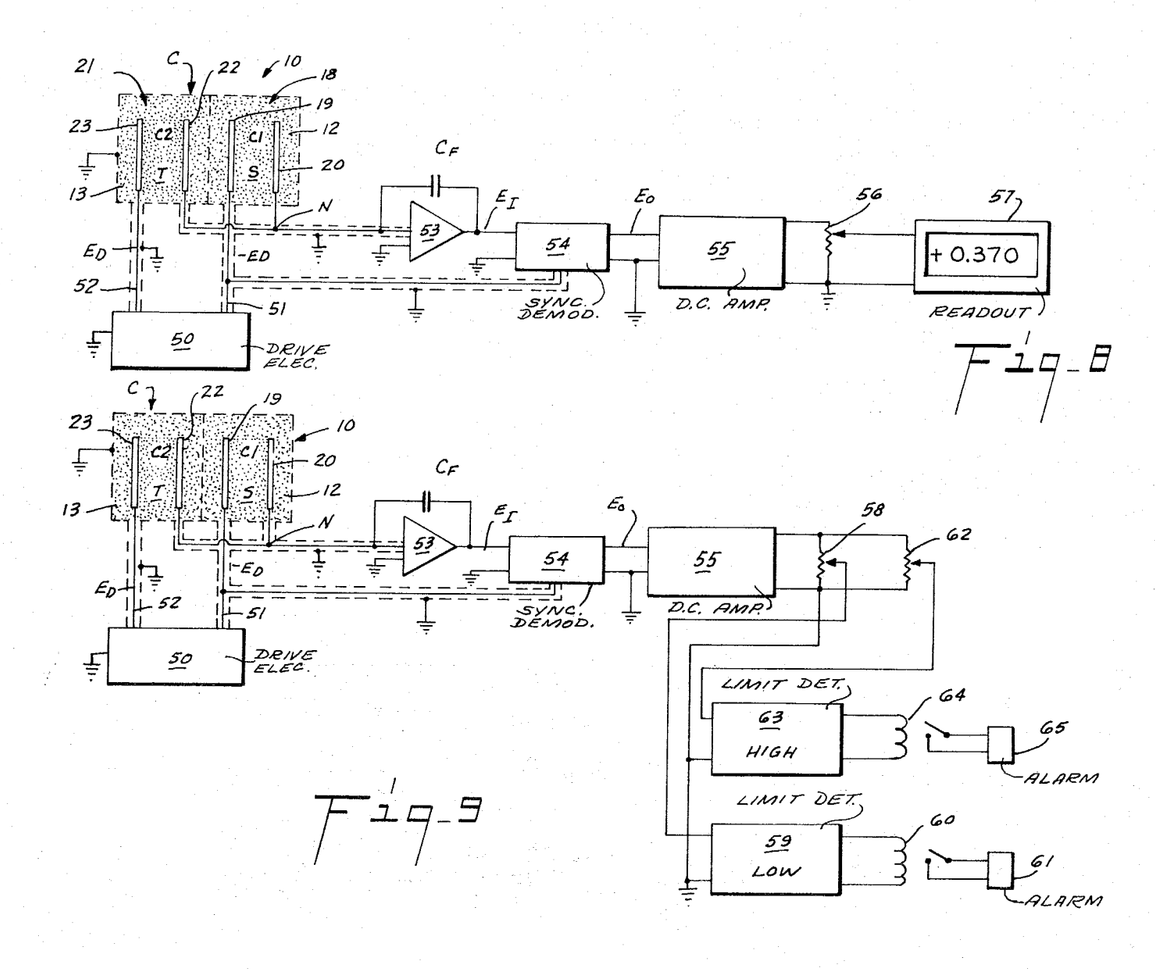
FIG. 8 is a schematic representation of the differential cell of FIG. 1 with the drive and receptor electronics connected to it to provide a quantitative read-out of the moisture content or ingredients ratio of the test sample, or the deviations thereof from the standard sample.
FIG. 9 is a schematic representation of the differential cell of FIG. 1 with the drive and receptor electronics connected to it to provide a warning or control signal when the moisture content or ingredients ratio of the test sample is above or below a predetermined amount.

FIG. 8 illustrates a preferred arrangement of differential cell 10 and differential capacitive device C with its associated input and output electronics to provide a quantitative readout of the difference in moisture content or ingredients ratio of samples S and T. A source 50 of electrical input signals is connected at one output 51 to driven element 19 and provides a first alternating current signal $E_D$ to this element, and is connected to a second output 52 to driven element 23 and provides an alternating current signal $-E_D$ of the same amplitude but of opposite phase to element 23. Each of receptor elements 20 and 22 are connected to an input of a high gain integrating amplifier 53 which includes a feedback capacitor $C_f$ connected from its output $E_I$ to the same input. When the input electrical signals are of a relatively low frequency, for example, 1 to 100 kHz, it is preferred that source 50 provide a square wave output at 51 and 52 because at these frequencies, it is easier to control the amplitude of the square wave signals, although, since a balanced output is obtained, precision control of the amplitude of the input signals is not generally necessary. When input signals at this relatively low frequency range are used, it is preferred that a synchronous demodulator 54 be connected to the output of amplifier 53 and to one of the outputs 51 and 52 of source 50 to convert the output signals $E_o$ of amplifier 53 in phase synchronism with the driven signals $E_D$ and $-E_D$ to provide a polarized direct current signal $E_o$ at the output of demodulator 54. It has been unexpectedly found that the use of synchronous demodulator 54 insures that the average value of the signal obtained at the output of demodulator 54 is unaffected by resistive leakage between the driven and receptor elements and that the effects of ion migration in the material are substantially reduced. The output is primarily affected by differences in dielectric constant.

If higher frequency input signals $E_D$ and $-E_D$ are used to drive elements 19 and 23, for example, up to several megacycles, then the effects of conductance are less and either square waves or sine wave signals may be used for the drive signals without the use of the synchronous demodulator. However, at higher frequencies, it is more difficult and expensive to control the wave form of square waves and timing errors may appear, and sine wave input signals are preferred. Also, even though it is more difficult to control the amplitude of sine wave signals at, for example, 1 mHz, since the present invention involves making a differential capacitive measurement, small errors in amplitude are generally not significant, particularly where they appear simultaneously on the two input signals of opposite phase.

In FIG. 8, a D.C. amplifier 55 is connected to the output of demodulator 54 and amplifies the output signal therefrom to an appropriate level. The output of amplifier 55 is connected to a scaling potentiometer 57 and to a readout device 56 which may be either an analog readout, or a digital readout as shown. Thus, the output signal from amplifier 55 may be scaled so that readout device 57 provides a direct readout of the difference in dielectric constant between samples S and T, or, for example, device 57 could read directly in moisture percentage above or below a reference level of dried rice, or the percentage of excess water in a water methane mixture.

FIG. 9 illustrates an arrangement of differential cell 10 connected to provide a control signal when the dielectric constant of sample T deviates from the dielectric constant of sample S by a predetermined amount. The control signal may be used to sound an alarm so that an operator can add or subtract water or other ingredients to a material in a process, or to operate solenoid valves to automatically control the addition or subtraction of water or other ingredients to such a material. The circuitry for the FIG. 9 apparatus is identical to that described in connection with FIG. 8, except that the output of amplifier 55 is to connect through a scaling pot 58 to a low limit detector 59 which provides an output signal to operate a relay 60 when the moisture content or ingredients ratio of sample T is below a preselected range of desired moisture content or ingredients ratio. Relay 60 is connected to operate an external apparatus 61 which may be an alarm or solenoid actuated control valve operable to permit the addition of more water or the deficient ingredient. The output of amplifier 55 is also connected through a second scaling pot 62 to a high limit detector 63 which provides an output signal to operate a relay 64 when the moisture content or ingredients ratio of sample T is above a preselected range. Relay 64 is connected to operate external apparatus 65 which also may be an alarm or solenoid actuated control valve operative to permit the withdrawal of excess water or other ingredients. For example, high limit detector 83 could be adjusted to close an alarm relay when its input reaches +100 millivolts corresponding to, say, six percent water with a five percent reference sample. The low limit detector 59 might be set at −90 millivolts corresponding to four percent water. These limits could be determined for a given material from empirical tests.

In FIGS. 8 and 9, the capacity between elements 19 and 20 can be called $C_1$ and the capacity between elements 22 and 23 can be referred to as $C_2$. The receptor plates 20 and 22 are connected together and connected to a null junction N clamped at virtual ground (substantially zero signal level with respect to ground) by integrating amplifier 53 with its capacitor $C_f$ in the feedback loop. The average potential at the null junction N is always extremely small compared to the drive signal potential and may go to zero when the two halves of cell 10 (a differential capacitive device C) are balanced, i.e., when $C_1 = C_2$. Cell 10 is designed so that $C_{1A} = C_{2A}$ (with A being the dielectric constant of air) when both sides are empty. The capacity of $C_1$ when filled with a material S of dielectric constant $K_S$ is simply:

$$C_1 = C_{1A} K_S \quad (1)$$

and the capacity of $C_2$ when filled with a material T of dielectric constant $K_T$ is:

$$C_2 = C_{2A} K_T \quad (2)$$

If the drive voltage is $E_D$ and the test sample T and standard sample S have no conductance, the output $E_I$ of amplifier 53 will be:

$$E_I = [(C_1 - C_2)/C_f] E_D \quad (3)$$

Since $C_{1A} = C_{2A}$, then:

$$E_I = E_D C_{1A}/C_f (K_S - K_T) \quad (4)$$

Since synchronous demodulator 54 provides a polarized direct current signal proportional to $(K_S - K_T)$ $$E = k(K_S - K_T) \quad (5)$$

Figure 10:
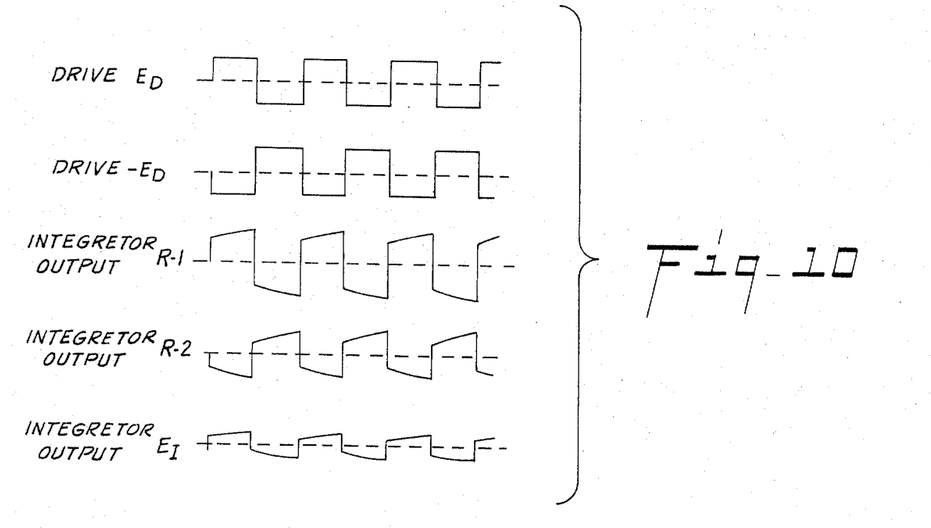
FIG. 10 shows wave forms which relate to the circuits of FIGS. 8 and 9.

In FIG. 10 wave forms R-1 and R-2 are shown as they would appear separately when each side of differential cell 10 is filled with samples S and T of cereal, grain, or other materials. The wave form shown for R-1 is typical of what would appear at the output of amplifier 53 with receptor element 22 disconnected from the circuit and the wave form R-2 is typical of what would appear at the output of amplifier 53 with the receptor element 20 disconnected from the circuit. When both receptor elements 20 and 22 are connected to amplifier 53, the output of amplifier 53 would appear as shown at the bottom of FIG. 10, i.e., it would reflect the integral of the difference of the currents flowing to the null junction N formed where elements 20 and 22 are connected together.

The presence of some conductance between the capacitive elements produces a slope which is equivalent to a triangular wave 90° out of phase with the drive signals. The output of synchronous demodulator 54 rejects the effect of the slope caused by pure shunt conductance of the samples S and T, i.e., the 90° component, and thus is responsive only to the dielectric constant of the material. The rounding of the slope, which does affect the output, is typical or organic materials with conductance due to ion migration. When the products on both sides of the cell are out of balance, the integrator has an output $E_I$ as shown at the bottom of FIG. 10. When both samples are alike, cancellation results in zero signal out regardless of the effects of conductance, wave form distortion due to ion migration, temperature, etc.

When the differential capacitive device C is out of balance, very small differences in the product samples, either in moisture content or ingredient ratio will be reflected in the amplitude of the output $E_o$ of the synchronous demodulator 54, and the polarity of signal $E_o$ will reflect which sample has the larger dielectric constant, moisture content or larger ratio or any ingredient with a higher dielectric constant.

Figure 11A:
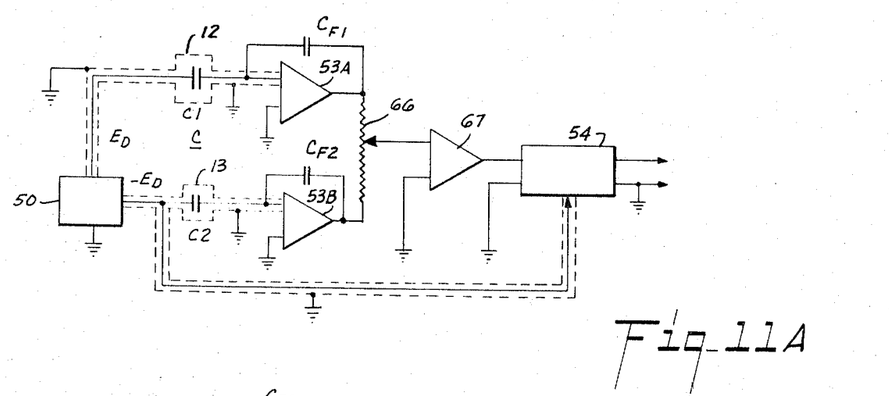
FIG. 11A is another form of the arrangement of FIGS. 8 and 9 using separate output amplifiers for the two three-terminal probes.

In certain applications, it may be desirable to have the probes or cavities in cell 10 different in size and shape from each which would cause a difference in the capacities between the capacitive elements of the cell so that, for example, $C_1$ may be greater than $C_2$. Such differences may be compensated for by making the drive voltages to elements 19 and 23 inversely proportional to the air or empty capacities $C_{1A}$ and $C_{2A}$ of the two probes 18 and 21. Alternately two integrating amplifiers 53 may be used as shown in FIG. 11A with separate integrating amplifiers 53A and 53B for each receptor element 20 and 22. The integrating amplifiers 53A and 53B will have the same output whenever:

$$C_{1A}/C_{f1} = C_{2A}/C_{f2} \quad (6)$$

where $C_{f1}$ and $C_{f2}$ are the respective feedback capacitors. The outputs of amplifiers 53A and 53B are added in the circuit shown which includes sources 50 of input signals $E_D$ and $-E_D$ and synchronous demodulator 54, and a potentiometer 66 is used to trim out any differences. It is merely necessary to zero the output on the wiper arm of potentiometer 66 with both cavities 12 and 13 empty. An amplifier 67 is connected between the wiper arm of potentiometer 66 and demodulator 54 to raise the level of the combined signal.

Figure 11B:
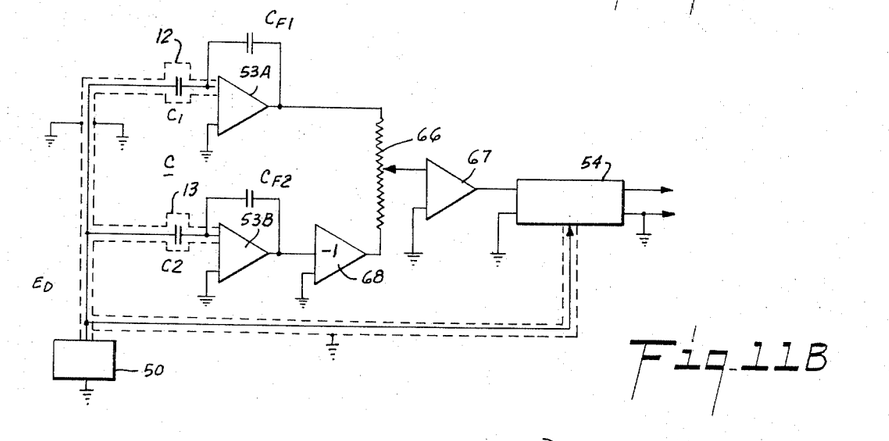
FIG. 11B is a less preferred embodiment using only one drive voltage source for driving both of the three-terminal capacitor probes.

FIG. 11B shows an arrangement which may be used with a single phase drive $E_D$. It is similar to FIG. 11A except that an inverting or "minus −1" amplifier 68 is connected between amplifier 53A and potentiometer 66 used to affect the amplifier 53A and potentiometer 66 used to effect the cancellation of errors in the slope and wave form of the output signal of amplifiers 53A and 53B. This is a less preferred embodiment as there are more sources of error in measuring small differences in dielectric constant.

Figure 12:
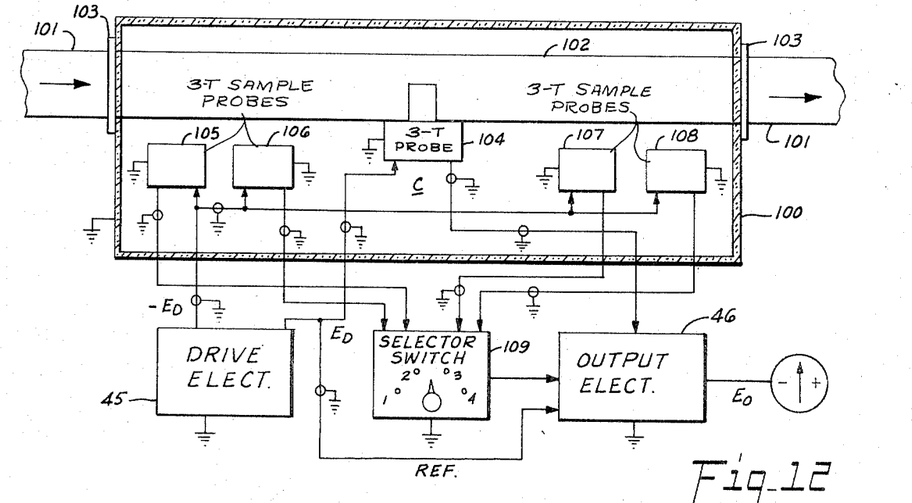
FIG. 12 illustrates the use of the three-terminal differential capacitive device of this invention to determine the interface of a number of different products in a flow pipeline.

In FIG. 12 a three-terminal differential capacitive device C is mounted in an insulated enclosure 100 connected to a pipeline 101 containing, for example, flowing crude oil, kerosene or gasoline. Enclosure 100 includes a flow conduit 102 connected in series with pipeline 101 through couplings 103 and differential capacitive device C includes a three-terminal capacitor test probe 104 mounted in conduit 102 so the feed through capacity of its capacitive elements is a function of the dielectric constant of the material flowing in pipeline 101. The driven element (high signal level terminal) of probe 104 is connected to output $E_D$ of drive electronics 45 and the receptor element (low signal level terminal) is connected to output electronics 46 which includes the components such as described with respect to FIGS. 8, 9, 11A and 11B, and the third terminal is ground. Differential capacitive device C also includes a plurality, for example, 4, of standard sample three-terminal capacitive probes 105, 106, and 107 and 108, each of which includes a standard sample of a material or mixture of materials likely to be encountered in the pipeline. The driven element (high signal level terminal) of each of probes 105– 108 is connected to output $-E_D$ of opposite phase from output $E_D$ and the receptor elements (low signal level terminals) of these probes are each connected to separate inputs of selector switch circuit 109, and the third terminal is ground. All connections between the probes 104–108 and the associated electronics are made by shielded cables which, in this instance (and also in FIGS. 13 and 14), for simplicity, are indicated by a grounded circle about the connecting cable. The output of selector switch circuit 109 is connected to the output electronics 46 and, depending on the position of the switch in circuit 109, one of probes 105–108 is connected with probe 104 to form differential capacitive device C so that output signal $E_o$ from output electronics 46 is proportional to the differences in the dielectric constant of the material in pipeline 101 and the standard sample in the standard sample probe switched in the circuit. For example, kerosene with a dielectric constant of 1.8 might be flowing in pipeline 101 and the standard sample in probe 105 (switch position 1) might be kerosene with a dielectric constant of 1.8, in which case the feed through capacity of probes 104 and 105 would be equal and $E_o$ zero. However, if gasoline was injected into pipeline 101, the dielectric constant of the material between the elements of probe 104 might change to about 1.9, causing an imbalance in differential capacitive device C, and output signal $E_o$ would be a value proportional to the difference (1) of the dielectric constant of the material flowing in pipeline 101 and the standard sample in probe 105. This difference indication would tell when the interface between the kerosene and gasoline arrived at probe 104 and also provide an indication of what the new mixture is. However, in order to more accurately determine the new product and balance the differential capacitive device C prior to the appearance of the next interface, the probe 106 which may contain a standard sample of gasoline of dielectric constant of 1.9 can be switched in the circuit (switch position 2). These steps can be repeated for as many different ingredients that appear or may appear in the pipeline at probe 104.

Figure 13:
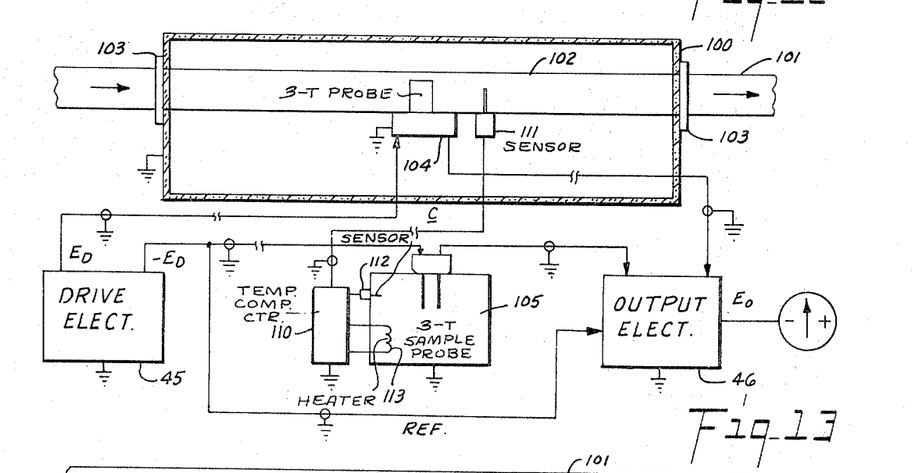
FIG. 13 illustrates an arrangement similar to FIG. 12 with a separate temperature controller for maintaining temperature equilibrium between the standard and test samples.

FIG. 13 illustrates apparatus similar to that described in FIG. 12, but with only one standard sample three-terminal capacitor probe 105 shown to form, with probe 104, three-terminal differential capacitive device C. However, to permit probe 105 to be located away from pipeline 101 (thus permitting easier access to change standard samples), which the present invention readily permits since long connecting cables can be used, a temperature compensating circuit 110 is provided. This circuit includes a sensing device 111 such as a thermocouple in conduit 102 which senses the temperature therein, a second sensing device or thermocouple 112 in probe 105 to sense the temperature therein, and a heater element 113 in probe 105 which is controlled by circuit 110 to maintain a temperature equilibrium between the material in pipeline 101 and the standard sample in probe 105. Circuit 110 may be a conventional circuit for this purpose which connects heater 113 to a source of energy when the temperature sensed by sensor 112 is below the temperature sensed by sensor 111 by a certain amount, and disconnects the heater from its energy source when the sensed temperatures are substantially equal. Suitable thermal insulation should be provided in probe 105 and enclosure 100 to help retain the temperature equilibrium when obtained.

Figure 14:
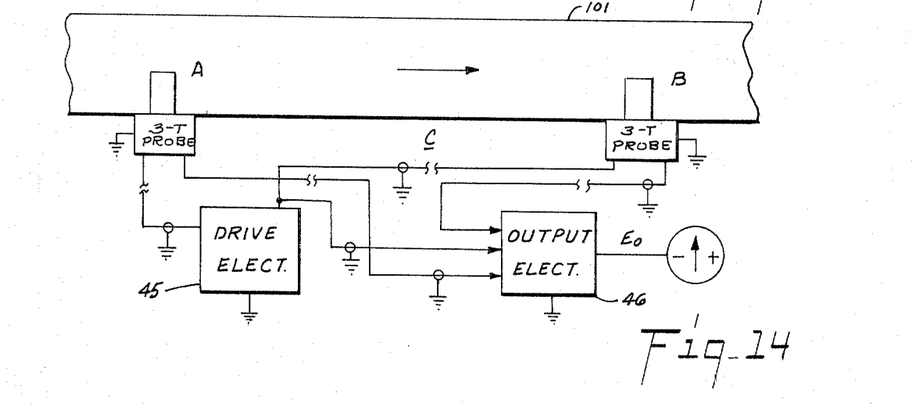
FIG. 14 illustrates the use of the three-terminal differential capacitive device of this invention to determine the time of arrival of a pipeline flow interface.

FIG. 14 illustrates an arrangement of three-terminal differential capacitive device C for use when only the time of arrival of a pipeline interface is desired. Device C includes two three-terminal probes A and B spaced apart in the pipeline 101 and connected through shielded cables to the input and output electronics 45 and 46, which are such as previously described in connection with one of FIGS. 8, 9, 11A and 11B. Prior to the arrival of the interface, the dielectric constant between probes A and B is equal and $E_o$ is zero. However, when the interface arrives at A and the dielectric constant of the material at A changes, an imbalance occurs between probes A and B and signal $E_o$ is proportional to this imbalance. In this instance, the material between the elements of probe B is the standard sample, however, it is not necessary that the value of the dielectric constant of the pipeline material be known.

Another application of the present invention similar to that illustrated in FIG. 14 would be to mount probes A and B spaced apart at different levels in a storage tank. In one instance, the two probes may have air dielectrics when the tank is empty or the level of the tank material is below the lower probe, and in this case a balanced condition will exist between the feed through capacities of probes A and B (assuming their capacity to be equal with air dielectric) and signal $E_o$ zero. Then, as the tank material (for example grain) is added, and reaches the level of the lower probe, an imbalance will occur between the feed through capacities of probes A AND B and signal $E_o$ will read off zero. When the level of the tank material reaches the upper probe, a balanced condition will be restored and signal $E_o$ will again be zero. Suitable gating circuits can be provided to utilize these changes in signal $E_o$ to signal the level condition or to control the level in the tank between two limits. In another instance, the upper and lower probe dielectrics may be different materials, for example, water and oil, and the interface between the material detected when it reaches the upper or lower probes. The present invention can also be used to detect the mere presence of a material having a dielectric constant different from an already present material (or air) and because of the comparative technique used in the present invention, the presence of materials having very small dielectric constants can be detected.

In all of the described embodiments, the dielectric constant of a standard sample of a material having a reference (known or unknown) dielectric constant is compared in a three-terminal differential capacitive device with that of a test sample of the material being measured. A temperature equilibrium is established between the samples and the effects of conductivity are minimized by either in the input and output electronics used. As noted, the apparatus of this invention can be used to tell when a product mixture is correct or when the percentage of moisture is correct and to give a quantitative indication of the mixture ratio or moisture content when out of balance. The use of three-terminal capacitors with a suitable integrating amplifier in the output electronics substantially eliminates the effects of cable capacity and other stray capacity. Also, first order effects of temperature and nonlinearities of the relationship between moisture content or mixture ratio are effectively canceled. As noted, the various methods and apparatus of this invention described can be used with many different products and in many different industrial processes, only some of which are specifically mentioned herein.

It is possible to use separate nonsynchronous demodulators, one with a positive output and one with a negative output, and add the differences to obtain the output signal in FIGS. 11A and 11B without departing from the spirit of my invention.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A three-terminal differential capacitive device for providing an electrical output signal proportional to the difference in dielectric constant of a first sample of material having a reference dielectric constant, and a second sample of material having a dielectric constant to be measured, wherein the measured dielectric constant is a function of a condition of said second sample with respect to said first sample, said device comprising in combination: a first three-terminal capacitor probe including a first electrically driven element, a first receptor element, first support means for supporting said first driven and receptor elements spaced from and adjacent to each other and in the proximity of said first sample so that the dielectric properties of said first sample affect the capacitive coupling between said first driven and receptor elements; a second three-terminal capacitor probe including a second electrically driven element, a second receptor element and second support means for supporting said second driven and receptor elements spaced from and adjacent to each other and in the proximity of said second sample so that the dielectric properties of said second sample affect the capacitive coupling between said second driven and receptor elements; a source of input electrical signals of predetermined amplitude with respect to circuit ground; first circuit means coupling said source to said first and second driven elements; second circuit means coupled to said first and second receptor elements for maintaining said receptor elements substantially at virtual ground while providing said electrical output signal proportional to the difference in dielectric constant of said first and second samples; and conductive means maintained at substantially zero potential with respect to circuit ground for shielding said second circuit means from said first circuit means except between said first driven and receptor elements and between said second driven and receptor elements.

2. The device of claim 1 further including converting means coupled to the output of said second circuit means for converting said electrical output signal to a direct current signal proportional to the difference in dielectric constant of said first and second samples.

3. The device of claim 2 wherein said converting means includes a demodulator connected to said source of input electrical signals and synchronized therewith to materially reduce the effect of resistive leakage and conductance of said first and second samples on said direct current signal.

4. The device of claim 1 wherein said source of input electrical signals provides first electrical input signals of a predetermined amplitude and second electrical input signals of substantially the same amplitude, but opposite phase, and said first circuit means includes first conducting means for conducting said first input electrical signals to one of said first and second electrically driven elements and second conductive means for conducting said second electrical input signals to said other electrically driven element, and said second circuit means includes an amplifier having a capacitive feedback circuit and connected at one input to said first and second receptor elements to form a null junction where a zero signal level is provided when the feed through capacities of said first and second three-terminal capacitors probes are equal.

5. The device of claim 1 further including a differential cell having a thermally insulated housing, and means for maintaining substantially temperature equilibrium in said housing, and wherein said first and second three-terminal capacitor probes are mounted in said housing.

6. The device of claim 5 wherein said first and second receptor elements are formed by a common receptor element and said first and second support means supports said common receptor element in said housing spaced apart and between said first and second electrically driven elements.

7. The device of claim 5 wherein said housing includes two cavities, one being a standard sample cavity for receipt of said first sample and the other a test sample cavity for receipt of said second sample, and said first three-terminal capacitor probe is mounted in said standard sample cavity and said second three-terminal capacitor probe is mounted in said test sample cavity.

8. The device of claim 7 wherein said source of input electrical signals provides first alternating current electrical input signals of a predetermined amplitude and second alternating current electrical input signals of substantially the same amplitude, but of opposite phase, and said first circuit means includes first conducting means for conducting said first input signals to one of said first and second electrically driven elements, and second conducting means for conducting said second input signals to the other electrically driven element, and wherein said second circuit means includes an amplifier having a capacitive feedback circuit and a demodulator connected to the output of said amplifier for converting the output thereof to a direct current signal proportional to the difference in dielectric constant of said first and second samples.

9. The device of claim 8 wherein said demodulator is connected to said source of input electrical signals and synchronized therewith to materially reduce the effect of resistance leakage and conductance of said first and second samples on said direct current signal.

10. The apparatus of claim 2 wherein said second circuit means further includes means for providing a quantitative indication proportional to the amplitude of said direct current signal.

11. The apparatus of claim 2 wherein said second circuit means includes means for providing a control signal when the amplitude of said direct current signal deviates from a preselected amplitude by a predetermined amount.

12. The device of claim 1 wherein said second circuit means includes a first amplifier connected at an input to one of said first and second receptor elements, and a second amplifier connected at an input to the other of said first and second receptor elements, each of said amplifiers including a capacitive negative feedback circuit, and wherein said second circuit further includes combining means connected to the output of each of said first and second amplifiers for combining the output signals therefrom to provide said electrical output signal.

13. The device of claim 12 wherein said source of electrical input signals provides electrical input signals of substantially the same amplitude and phase to said first and second electrically driven elements, and said second circuit means further includes means connected between the output of one of said first and second amplifiers and said combining means for inverting the output signals from said one amplifier.

14. The device of claim 12 wherein said source of electrical input signals provides first electrical input signals of predetermined amplitude to said first electrically driven element, and second electrical input signals of substantially the same amplitude, but of opposite phase, to said second electrically driven element.

15. The device of claim 1 wherein said second sample is a material in a container and further including means for mounting said second three-terminal capacitor probe in said container to be responsive to the dielectric constant of the material in said container.

16. The device of claim 15 wherein said first three-terminal capacitor probe is disposed remotely from said container and further including means connected between said container and said first three-terminal capacitor probe to establish and maintain substantially temperature equilibrium between said first and second three-terminal capacitor probes.

17. The device of claim 15 wherein said container is a pipeline which provides for the flow of a plurality of different materials with flow interfaces between them and said second three-terminal capacitor probe has a different feed through capacity when adjacent to a different one of said interfaces, and wherein a plurality of said first three-terminal capacitor probes are provided each including a different first sample simulating the dielectric of said second three-terminal capacitor probe when adjacent a different one of said interfaces, and further including switch means connected to each of said first three-terminal capacitor probes and said second circuit means to selectively connect a desired one of said first three-terminal capacitor probes to said second circuit means.

18. The device of claim 15 wherein said container is a pipeline and said first and second samples are materials flowing in said pipeline and further including means for mounting said first three-terminal capacitor probe in said pipeline spaced from said second three-terminal capacitor probe, to be responsive to the dielectric constant of the material in the pipeline, whereby the arrival at one of said three-terminal capacitor probes of an interface between two materials in the pipeline can be detected.

19. A differential capacitive cell for permitting determination of the difference in dielectric constant of a standard sample of a material to be tested and a test sample of such material while providing substantially temperature equilibrium between the samples, comprising, in combination: a housing; a first conductive driven element mounted in said housing and adapted to be connected to a source of electrical input signals; a second conductive driven element mounted in said housing and spaced from said first conductive driven element and adapted to be connected to a source of electrical input signals; conductive receptor means mounted in said housing and adapted to be connected to an electrical output circuit to provide an electrical output signal which is a function of the difference in feed through capacity between each of said conductive driven elements and said receptor means, said receptor means being aligned with respect to said first conductive driven element to provide a first three-terminal capacitor in which said standard sample can be placed between said first conductive driven element and said receptor means so that the feed through capacity of said first three-terminal capacitor is a function of the dielectric constant of said standard sample, and said receptor means also being aligned with respect to said second conductive driven element to provide a second three-terminal capacitor in which said test sample can be placed between said second conductive driven element and said receptor means so that the feed through capacity of said second three-terminal capacitor is a function of the dielectric constant of said test sample.

20. The differential capacitive cell of claim 19 wherein said receptor means is a single receptor element mounted in said housing between said first and second conductive driven elements, and provides a common receptor element for each of said three-terminal capacitors.

21. The differential capacitive cell of claim 19 wherein said housing includes two cavities, one being a standard sample cavity for receipt of said standard sample and the other a test cavity for receipt of said test sample, and said first conductive driven element is mounted in said standard sample cavity and said second conductive driven element is mounted in said test cavity, and wherein said receptor means includes a first receptor element mounted in said standard sample cavity and spaced from said first conductive driven element to provide one of said three-terminal capacitors, and a second receptor element mounted in said test cavity and spaced from said second conductive driven element to provide the other of said three-terminal capacitors.

22. The differential capacitive cell of claim 21 wherein said test cell is adapted to be connected to a process flow line to provide on-stream monitoring of a condition of the material in the flow process.

23. A method of comparing the dielectric constant of a first sample of material having a reference dielectric constant and the dielectric constant of a second sample of material having a dielectric constant to be measured, comprising the steps of: placing a first three-terminal capacitor having a first electrically driven element and a first receptor element in close proximity to said first sample so that said first sample affects the capacitive coupling between said first driven and receptor elements; placing a second three-terminal capacitor probe having a second electrically driven element and a second receptor element in close proximity to said second sample so that said second sample affects the capacitive coupling between said second driven and receptor elements; establishing a temperature equilibrium between said first and second samples; driving said first and second electrically driven elements with alternating current input signals of predetermined amplitude with respect to circuit ground; clamping the potential on said first and second receptor elements at virtual ground while conducting said potential to a differential output null junction to provide an electrical output signal responsive to the difference in the dielectric constant of said first and second samples; and converting said electrical output signal to a measurable direct current signal.

24. The method of claim 23 wherein said first sample is a standard sample of a material having a desired moisture content and said second sample is a test sample of the same material having an unknown moisture content, and further including the step of scaling said direct current signal to provide a quantitative representation of the percentage of moisture in said second sample.

25. The method of claim 23 wherein said first sample is a standard sample of a material having a desired ingredients ratio and said second sample is a test sample of the same material having an unknown ingredients ratio, and further including the step of scaling said direct current signal to provide a quantitative representation of the percentage of an ingredient in said second sample.

26. The method of claim 23 wherein said driving step includes driving said first electrically driven element with a first input electrical signal of one phase and amplitude and driving said second electrically driven element with a second electrical input signal of substantially the same amplitude as said first input electrical signal, but of opposite phase, and wherein said clamping step is provided by connecting said first and second receptor elements together to form said null junction and utilizing an integrating amplifier having a capacitive feedback loop to clamp said null junction to virtual ground while providing said electrical output signal, and wherein said converting step is synchronized by one of said first and second input signals to effectively cancel the effect of conductance in said first and second samples from said direct current signal.

27. The method of claim 23 wherein said first and second three-terminal capacitor probes are utilized to determine the interface of pipeline products.

28. The method of claim 23 wherein said first and second three-terminal capacitor probes are utilized to determine a material level in a container.

* * * * *